United States Patent Office 2,747,419
Patented May 29, 1956

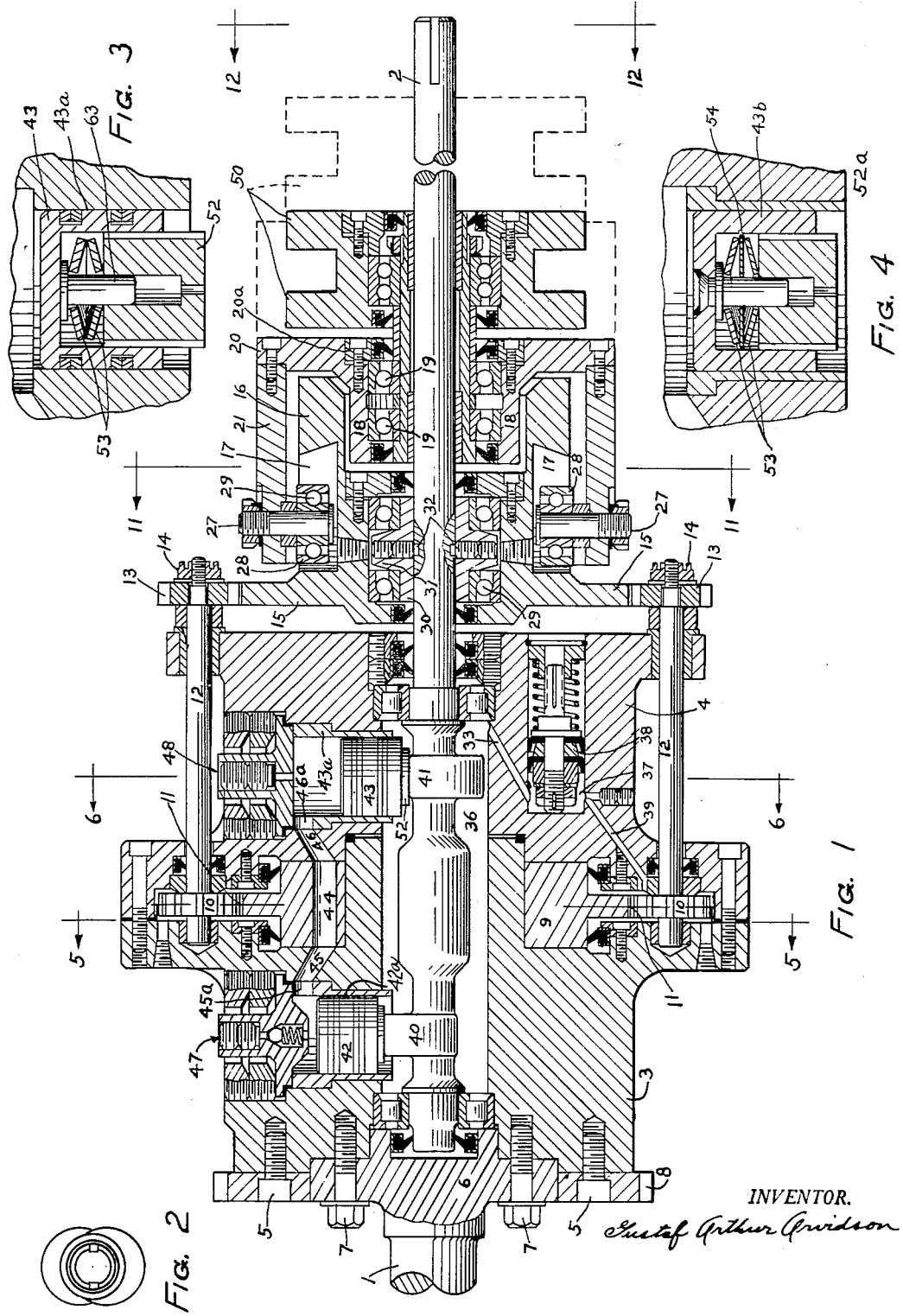

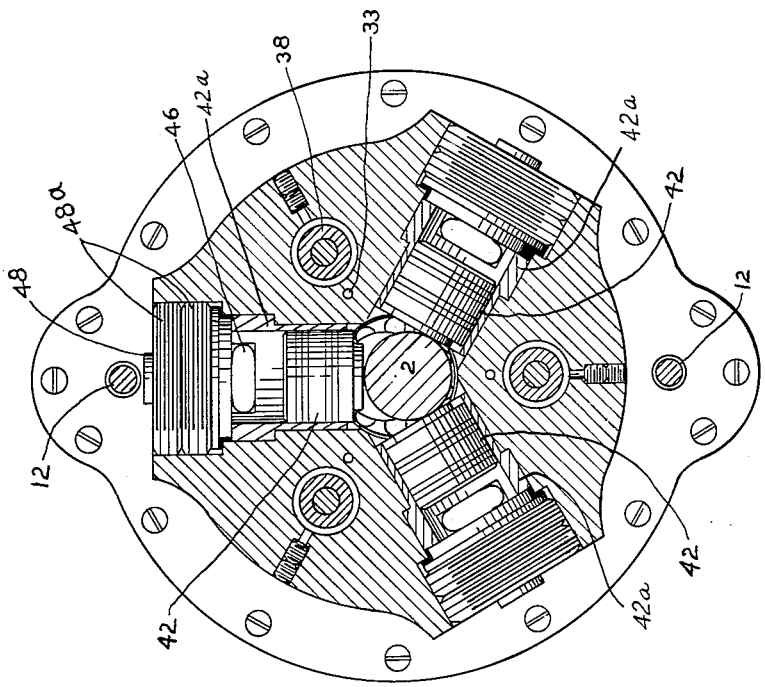
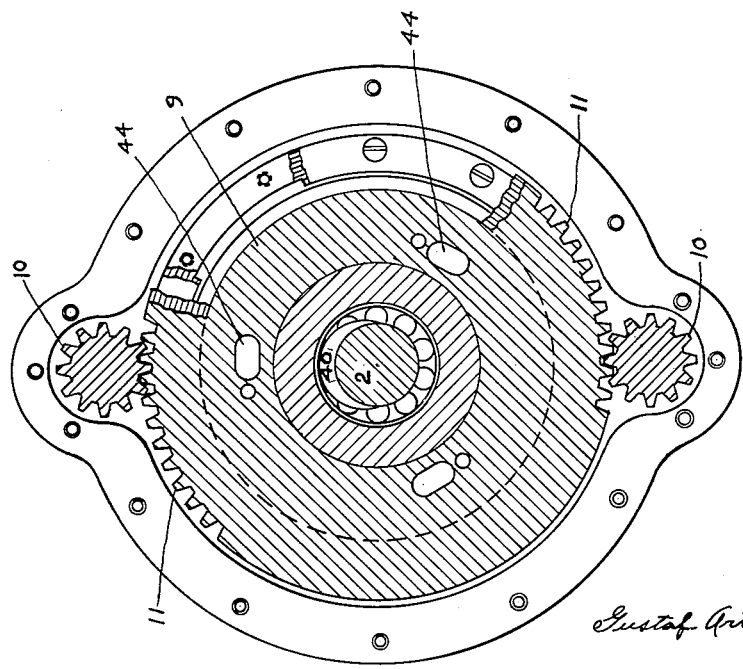

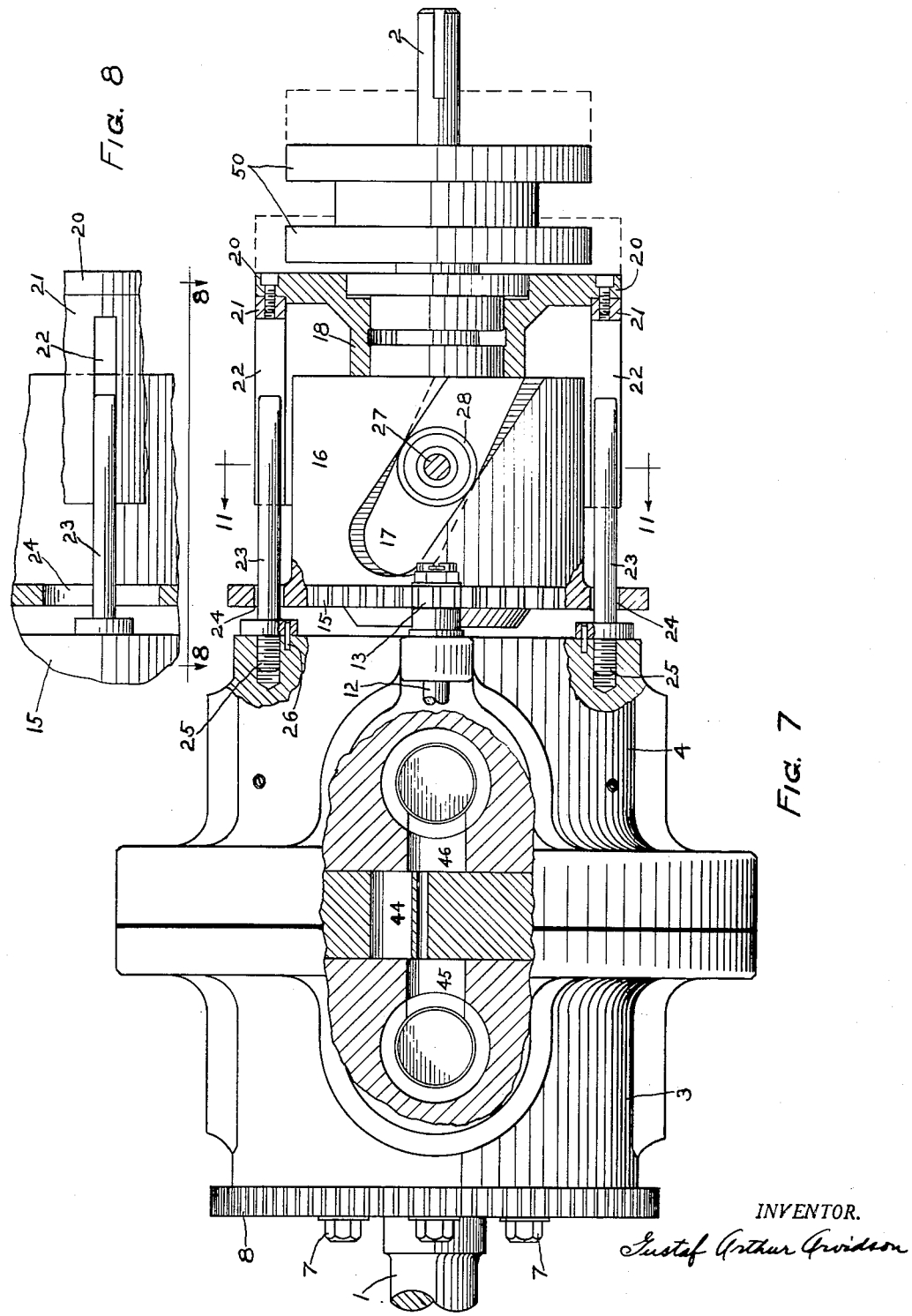

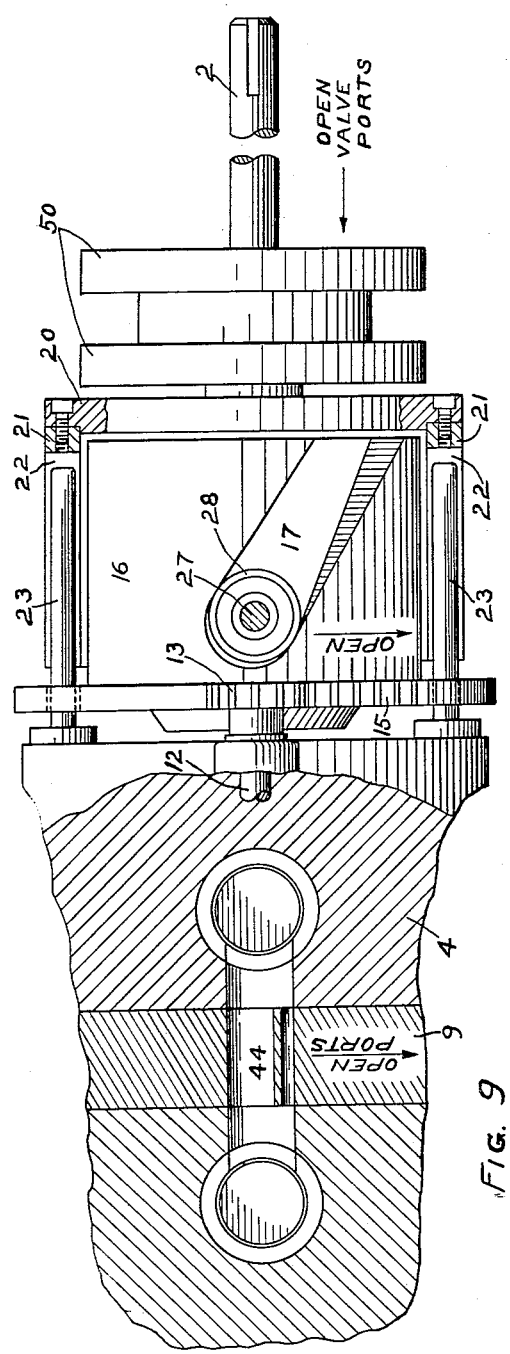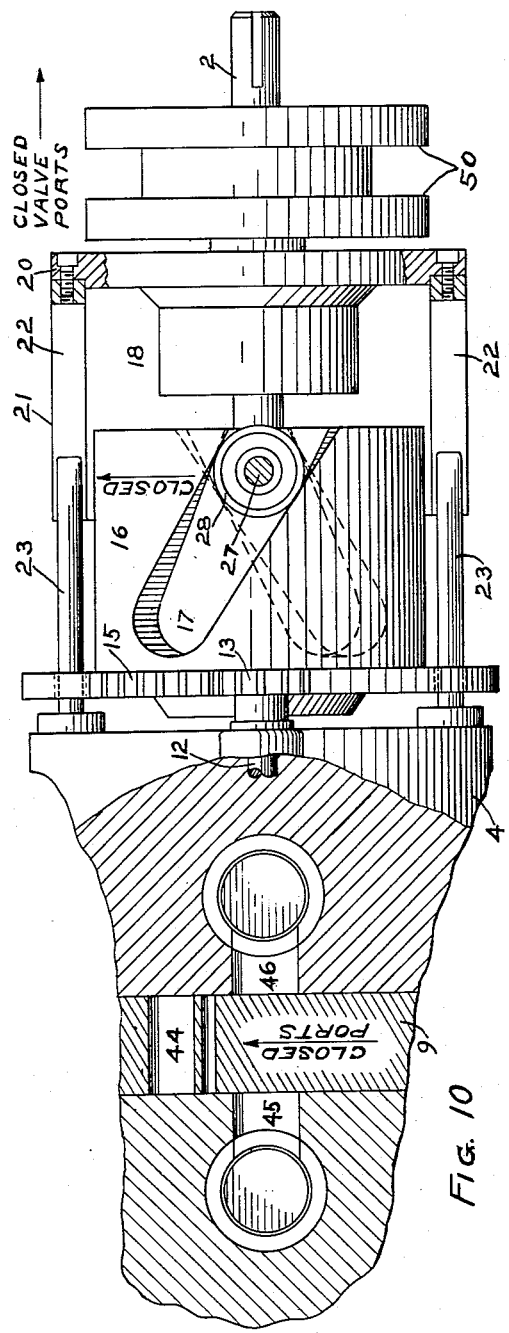

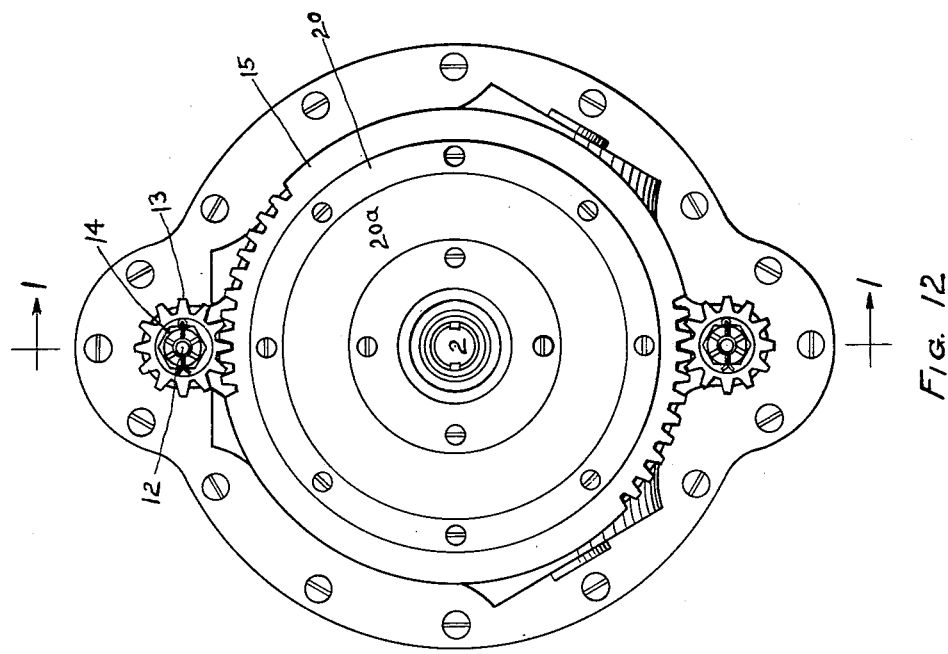

2,747,419

VALVE CONTROL MECHANISM FOR POWER TRANSMISSION MEANS

Gustaf Arthur Arvidson, Davenport, Iowa, assignor of forty per cent to William J. Huls, Davenport, Iowa Application October 26, 1951, Serial No. 253,400

6 Claims. (Cl. 74—107)

This invention relates to a power transmission mechanism, converting torque at variable speeds, and valve control means therefor, and includes, among its objects, the provision of a rotary driving means for transmitting power from one shaft to another; the provision of an improved longitudinal shifter for a rotary valve; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only, and not to be interpreted in a limiting sense.

In the drawings annexed hereto and forming a part hereof,

Fig. 1 shows a longitudinal section of a connector for a pair of rotary shafts, substantially along the plane indicated by the line 1—1 in Fig. 12;

Fig. 2 shows an end view of one of the driving shafts, detached;

Fig. 3 shows a piston in longitudinal section with the surrounding cylinder wall also in section;

Fig. 4 shows a modified form of piston, in section;

Fig. 5 shows a transverse section, partly broken away, approximately along the broken plane indicated by the line 5—5 in Fig. 1;

Fig. 6 shows a section substantially along the plane indicated by the line 6—6 in Fig. 1;

Fig. 7 shows a broken plan view of the structure shown in Fig. 1;

Fig. 8 is a fragmentary view, looking down at a right angle to Fig. 7, the direction being indicated by the line 8—8 in Fig. 7;

Fig. 9 is a plan view, partly broken away, to show the relationship of the ports and the valve operating mechanism;

Fig. 10 is a similar view with the ports closed;

Fig. 11 is a transverse sectional view taken substantially along the line 11—11 in Fig. 1;

Fig. 12 is an end elevational view taken in the direction indicated by the line 12—12 in Fig. 1.

Reference will now be made in greater detail to the annexed drawings for a more complete description of this invention. When a pair of aligned shafts are to be driven at varying speeds, or the identical speed, it may be necessary to have some sort of connection between them. They may be connected by a clutch which makes them run in synchronism, or they may be connected by a fluid clutch which allows a continuous variable speed clutching action. The resistance may be controlled, as desired, by a rotating valve which allows a more or less free exchange of fluid between a pair of cylinders or between cylinders and a compartment carrying the fluid, preferably oil as shown and claimed in my U. S. Patent 2,627,324. It is with this type of actuating mechanism that my present invention is concerned, and more particularly with the actuating mechanism for the valve which controls the flow of fluid.

A pair of cooperating main shafts 1 and 2 are connected by a housing unit comprising a pair of members 3 and 4. The shaft 1 has a disk 6 connected by bolts 7 to member 3. A gear 8 surrounds the disk 6 and is secured to member 3 by bolts 5. Power may be taken off or applied to the mechanism by a gear meshing with gear 8. Whether there will be a speed reduction by the gear 8 or a speed step-up will be dependent upon the relative sizes of the gear 8 and the gear meshing therewith.

Between the members 3 and 4 there is an annular space which is occupied by a rotary valve member 9 which may be rotated by driven pinions 10 meshing with gear teeth 11 on the exterior of the rotary valve member 9. Each pinion 10 is keyed to the inner end of a valve-operating shaft 12 which has at its outer end a driving pinion 13, secured in place by a nut 14, which pinion 13 meshes with a control member or gear 15.

The gear 15 has rigidly secured thereto and coaxially projecting therefrom a hollow hub 16 which has diametrically opposed wall portions provided respectively with externally opening cam grooves 17, each groove being angularly and axially directed in the form of the section of a helix. The gear and hub are journaled on the main shaft 2 and are held against axial movement relative to said main shaft by a first combined radial-load and axial-thrust bearing 30 which has a radial thrust flange 31 and which is secured to the main shaft by means of set screws 32, access to which from outside the hub is had via plugged openings as shown.

A sleeve 21 concentrically surrounds the hub 16 and has rigidly secured thereto a radial end wall portion or flange 20 apertured to receive the main shaft 2. Diametrically opposed portions of the sleeve are formed respectively with axially directed guide slots 22 that respectively receive guide means in the form of pins 23 that are secured to and project from the proximate end of the housing 3, 4. The gear 15 has a pair of diametrically opposed arcuate slots 24, concentric with the main shaft 2, through which the guide pins respectively extend, the pins and slots 24 serving to enable angular movement of the gear 15 within limits relative to the housing 3, 4 and the pins and guide slots 22 serving to hold the sleeve 21 against rotation relative to the housing while permitting relative axial shifting. Diametrically opposed pintles 27 respectively mount cam followers or rollers 28 on the sleeve 21 by means of ball bearings 29, and these rollers extend respectively into the cam grooves 17 of the hub 16, whereby axial shifting of the sleeve acts through the rollers and cam grooves to move the hub and gear angularly relative to the housing, thus turning the pinions 13 and shafts 12 and hence adjusting the rotary valve 9.

Axial shifting of the sleeve is effected by means of a control collar 50 which is journaled on the main shaft via means including bearings 19 and a central tubular portion 18 rigid on the sleeve end wall 20, the bearings serving not only to journal the sleeve and collar for relative rotation but to interconnect the collar and sleeve for axial movement in unison and thus comprising a second radial-load and axial-thrust bearing means.

One or more channels 33 are provided, leading from shaft concavity 36 to expansion chamber or chambers 37 in which there is a piston 38. A channel 39 leads from the chamber 37 into the space in which the pinions 10 and gear 11 are located. It will therefore be obvious that when the gear 15 is rotated, it will cause rotation of the shafts 12, pinions 10, and rotary valve member 9, the shaft 2 being held stationary, relatively to the body. It will be understood that, as the shaft 2 is rotated, relatively to the body, eccentrics 40 and 41 will be caused to turn and will cause pistons 42 and 43 to reciprocate.

The cylinders 42a and 43a are provided with ports 45a and 46a to connect the cylinders with the channels 44, 45, and 46. However, when the rotary valve member 9 rotates into a position such that channel 44 is not in alignment with the channels 45 and 46, the oil in the chambers in which the pistons 42 and 43 reciprocate cannot move back and forth and, therefore, the shaft 2 is locked to the body and, hence, the shaft 2 is in direct drive with the body members 3 and 4. This transmits rotary motion to the shaft 2. Plugs are screwed into filling openings 47 and 48, by which the cylinders are filled with fluid, oil or other cylinder liquid, which is pumped back and forth between the cylinders when the rotary valve member 9 is partly or wholly open. Shifting member or slider 50 may slide longitudinally of the shaft 2 and thereby shift the hub 18 with consequent rotation of the rotary valve member 9.

A secondary piston 52, as shown in Fig. 3, may slide in the piston 42 or 43 and be kept extended by the "Belleville" springs 53. The piston of Fig. 4 is somewhat similar to that of Fig. 3. However, the piston 43b of Fig. 4 is not provided with piston rings as is piston 43a of Fig. 3. The secondary piston 52a is somewhat shorter than piston 52, and the "Belleville" springs are separated by a washer 54.

The operation of opening and closing the rotary valve member 9 is shown more in detail in Figs. 9 and 10. When the shifting member 50 is pulled to the right, as shown in these two figures, the pintle 27 and roller 28 are pulled to the right with the result that the gear 15 is turned in the direction of the arrow "closed" (Fig. 10) and, through this, the pinions 13 and shafts 12 rotate the rotary valve member 9.

It is of course understood that the specific description of structure set forth above may be departed from without departing from the spirit of this invention as disclosed in this specification and as defined by the appended claims.

What is claimed is:

1. A hydraulic device of the class described, comprising: a housing having a rotary valve intermediate its ends and coaxially journaling a main shaft projecting from one end thereof; a pair of parallel valve-operating shafts journaled in the housing on diametrically opposed axes as respects the main shaft, each operating shaft having an end portion at said one end of the housing provided with a pinion; a control gear coaxially disposed at said one end of the housing and surrounding the main shaft, said gear having diametrically opposed portions meshing respectively with the pinions and further having diametrically opposed arcuate slots angularly intermediate the pinions and concentric with the main shaft; a pair of axially extending parallel guide pins secured to and projecting from said one end of the housing and respectively through said arcuate slots and enabling angular movement of the gear relative to the housing within the extent of said arcuate slots; a hollow hub rigid on and extending coaxially from the gear in surrounding relation to the main shaft, said hub having diametrically opposed portions provided respectively with externally opening cam grooves directed angularly and axially thereof; combined radial-load and axial-thrust bearing means journaling the hub and gear on the main shaft and holding said hub and gear against axial displacement relative to said main shaft; a sleeve concentrically surrounding the hub and having diametrically opposed axially directed guide slots therein respectively receiving the guide rods to hold the sleeve against rotation while enabling axial shifting of said sleeve relative to the housing, said sleeve having a radial end wall portion apertured centrally to receive the main shaft; means journaling the sleeve for rotation relative to the main shaft; an axially shiftable and rotatable collar on the main shaft; means interconnecting the collar and the sleeve for shifting of the collar and sleeve axially in unison while enabling relative rotation between the two; and a pair of diametrically opposed cam followers carried by the sleeve and received respectively by the cam grooves on the sleeve to incur angular movement of the hub and gear in response to axial shifting of the collar and sleeve.

2. The invention defined in claim 1, in which: the combined radial-load and axial-thrust bearing comprises a member secured to the main shaft within the hub and having an annular thrust rib centrally thereof and a pair of bearing elements coaxially carried by the member, one at each side of the rib.

3. The invention defined in claim 1, in which: the means interconnecting the collar and end wall portion of the sleeve comprises a second radial-load and axial-thrust bearing means inter-journaling said sleeve and collar.

4. The invention defined in claim 3, in which: the end wall portion on the sleeve has rigid thereon a coaxial tubular portion encircling said second radial-load and axial-thrust bearing means, said tubular portion itself being encircled by the hub.

5. A hydraulic device of the class described, comprising: a housing having a rotary valve intermediate its ends and coaxially journaling a main shaft projecting from one end thereof; a pair of parallel valve-operating shafts journaled in the housing on diametrically opposed axes as respects the main shaft, each operating shaft having an end portion at said one end of the housing provided with a pinion; a control gear coaxially disposed at said one end of the housing and surrounding the main shaft, said gear having diametrically opposed portions meshing respectively with the pinions; a hollow hub rigid on and extending coaxially from the gear in surrounding relation to the main shaft, said hub having diametrically opposed portions provided respectively with externally opening cam grooves directed angularly and axially thereof; combined radial-load and axial-thrust bearing means journaling the hub and gear on the main shaft and holding said hub and gear against axial displacement relative to said main shaft; a sleeve concentrically surrounding the hub and having a radial end wall portion apertured centrally to receive the main shaft; means journaling the sleeve for rotation relative to the main shaft; means secured to the housing and axially slidably engaging the sleeve to hold the sleeve against rotation relative to the housing while permitting axial shifting of the sleeve; an axially shiftable and rotatable collar on the main shaft; means interconnecting the collar and the sleeve for shifting of the collar and sleeve axially in unison while enabling relative rotation between the two; and a pair of diametrically opposed cam followers carried by the sleeve and received respectively by the cam grooves on the sleeve to incur angular movement of the hub and gear in response to axial shifting of the collar and sleeve.

6. A hydraulic device of the class described, comprising: a housing having a rotary valve intermediate its ends and coaxially journaling a main shaft projecting from one end thereof; a valve-operating shaft journaled in the housing on an axis parallel to the main shaft and having an end portion at said one end of the housing provided with a pinion; a control gear coaxially disposed at said one end of the housing and surrounding the main shaft and meshing with the pinion; a hollow hub rigid on and extending coaxially from the gear in surrounding relation to the main shaft, said hub having an externally opening cam groove directed angularly and axially thereof; combined radial-load and axial-thrust bearing means journaling the hub and gear on the main shaft and holding said hub and gear against axial displacement relative to said main shaft; a sleeve concentrically surrounding the hub and having a radial end wall portion apertured centrally to receive the main shaft; means journaling the sleeve for rotation relative to the main shaft; means secured to the housing and axially slidably engaging the sleeve to hold the sleeve against rotation relative to the housing while permitting axial shifting of the sleeve;

an axially shiftable and rotatable collar on the main shaft; means interconnecting the collar and the sleeve for shifting of the collar and sleeve axially in unison while enabling relative rotation between the two; and a cam follower carried by the sleeve and received by the cam groove on the sleeve to incur angular movement of the hub and gear in response to axial shifting of the collar and sleeve.

References Cited in the file of this patent

UNITED STATES PATENTS

| | | |
|---|---|---|
| 951,318 | Kjerulff | Mar. 8, 1910 |
| 1,195,385 | Mottlau | Aug. 22, 1916 |
| 1,510,153 | Myers | Sept. 30, 1924 |
| 1,896,788 | Leach | Feb. 7, 1933 |
| 1,960,089 | Rabb | May 22, 1934 |
| 2,096,853 | Highsmith | Oct. 26, 1937 |
| 2,104,151 | Brisbane et al. | Jan. 4, 1938 |
| 2,308,705 | Meredith | Jan. 19, 1943 |
| 2,413,203 | Weengart | Dec. 24, 1946 |
| 2,415,285 | Hurst | Feb. 4, 1947 |
| 2,442,999 | Ebleberry | June 8, 1948 |
| 2,627,324 | Arvidson | Feb. 3, 1953 |

FOREIGN PATENTS

| | | |
|---|---|---|
| 378,817 | Great Britain | Aug. 18, 1936 |
| 402,872 | Italy | 1943 |
| 749,533 | Germany | 1944 |